United States Patent
Winship

(10) Patent No.: US 8,502,090 B2
(45) Date of Patent: Aug. 6, 2013

(54) BARRIER FOR BARRIER CONNECTOR

(75) Inventor: Phillip Steven Winship, Swadlincote (GB)

(73) Assignee: Cable Management Products Limited, Birmingham (GB)

( * ) Notice: Subject to any disclaimer, the term of this patent is extended or adjusted under 35 U.S.C. 154(b) by 139 days.

(21) Appl. No.: 13/047,972

(22) Filed: Mar. 15, 2011

(65) Prior Publication Data

US 2011/0226525 A1  Sep. 22, 2011

(30) Foreign Application Priority Data

Mar. 18, 2010 (GB) .................................. 1004553.2

(51) Int. Cl.
*H02G 3/18* (2006.01)
*H02G 15/04* (2006.01)

(52) U.S. Cl.
USPC ........ 174/650; 174/72 A; 174/77 R; 174/667; 439/271; 439/275; 277/314; 277/602

(58) Field of Classification Search
USPC ............... 174/650, 667, 652, 651, 72 A, 653, 174/76, 77 R, 88 R, 137 R, 158 R, 152 G, 174/153 G, 152 R, 151, 84 R; 439/550, 271, 439/272, 275, 276, 277; 277/312, 314, 602, 277/608, 617, 625, 628

See application file for complete search history.

(56) References Cited

U.S. PATENT DOCUMENTS

| | | | | |
|---|---|---|---|---|
| 3,022,484 A * | 2/1962 | Thompson, Jr. | ............... | 439/550 |
| 3,714,012 A * | 1/1973 | Herron | ....................... | 174/152 R |
| 3,761,601 A * | 9/1973 | Kaesser et al. | ................ | 174/659 |
| 4,493,522 A * | 1/1985 | Law | ............................... | 439/271 |
| 4,580,865 A * | 4/1986 | Fryberger | ...................... | 439/277 |
| 4,778,949 A * | 10/1988 | Esterle et al. | ................. | 174/151 |
| 4,963,698 A * | 10/1990 | Chang et al. | ................. | 174/77 R |
| 5,397,859 A * | 3/1995 | Robertson et al. | ........... | 174/84 R |
| 5,399,807 A * | 3/1995 | Yarbrough et al. | .......... | 174/653 |
| 5,470,622 A * | 11/1995 | Rinde et al. | .................. | 174/84 R |
| 5,532,433 A * | 7/1996 | Endo et al. | ................... | 174/77 R |
| 5,606,148 A * | 2/1997 | Escherich et al. | .......... | 174/84 R |
| 6,218,625 B1 * | 4/2001 | Pulaski | ...................... | 174/153 G |
| 6,232,554 B1 * | 5/2001 | Yamazaki et al. | ............ | 174/653 |
| 7,355,130 B2 * | 4/2008 | Holman et al. | ........... | 174/153 G |
| 7,737,361 B2 * | 6/2010 | Huspeni et al. | ............. | 174/84 R |

FOREIGN PATENT DOCUMENTS

DE 4109614 A1 9/1992
EP 2 107 289 A1 10/2009

* cited by examiner

*Primary Examiner* — Angel R Estrada
(74) *Attorney, Agent, or Firm* — Snyder, Clark, Lesch & Chung, LLP

(57) ABSTRACT

A barrier of foamed phenolic resin is provided for a barrier connector. In use, the barrier temporarily holds cables in place while a potting agent is used to permanently secure said cables within the barrier connector.

15 Claims, 1 Drawing Sheet

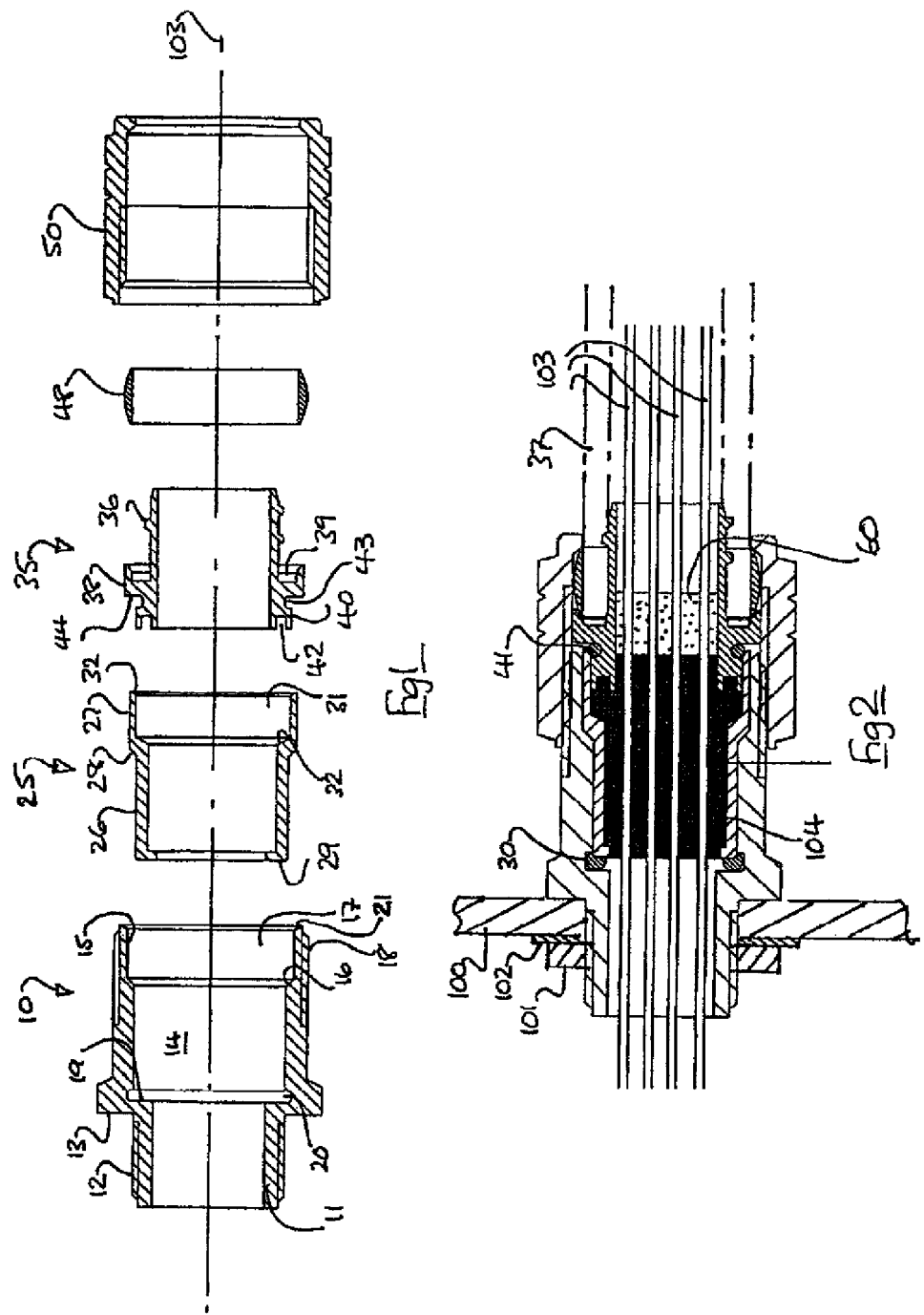

BARRIER FOR BARRIER CONNECTOR

RELATED APPLICATION

This application claims priority under 35 U.S.C. § 119 based on United Kingdom (GB) Patent Application No. 1004553.2, filed Mar. 18, 2010, the disclosure of which is hereby incorporated by reference herein.

TECHNICAL FIELD

This invention relates to an insert for a barrier connector, intended to seal an aperture in a barrier through which electrical data cables pass in use.

BACKGROUND TO THE INVENTION

It can be appreciated that electrical data cables may need to be sealed to a barrier, such as a bulkhead, in order to isolate one side of the barrier from the other. For example the barrier may comprise an enclosure having a noxious or dangerous atmosphere on the inside, or there may be equipment within an enclosure which must be hermetically sealed for safe operation.

Various kinds of barrier connectors have been proposed. Typically barrier connectors are provided with a range of bore sizes, and an operator selects a connector having a bore adequate for the number of cables to be passed through the barrier. Some means must be provided for sealing the passage through the connector, because no matter how tightly fitted, some interstices between the cables will remain. Frequently these interstices may be quite large, especially if the cables are loosely fitted in the connector.

Usually a two-part epoxy sealant is stuffed into the bore of the connector as a potting material to make a seal—such sealant is mixed just prior to stuffing, and cures to a hard substance after about 4 hours. If the sealant is semi-solid it can be difficult to stuff around the cables. On the other hand, if the sealant is liquid it is able to fully enter the interstices, but it can be difficult to keep it and the cables it supports in the desired position. Liquid sealant is, before curing, liquid enough to run rather than remaining in place around the cables.

Other features of a typical connector are an ability for attachment to the barrier, and the ability to accept cable sheaths which protect the cable(s) between the barrier and the equipment to which they are connected in use.

Current designs of barrier connectors have disadvantages which the present invention seeks to address.

In this specification, references to closing the passageway through a connector mean closing said passageway sufficiently to prevent liquid sealant running out through it. A full closure is not always required, but depends on the viscosity of fresh sealant.

SUMMARY OF THE INVENTION

According to the present invention there is provided a barrier for use in a barrier connector, the barrier comprising unapertured foamed phenolic resin and being of a size and shape such as to close a passageway through a barrier connector. In a preferred embodiment the cross sectional area of the barrier is greater than that of the passageway (typically a bore) through the barrier connector, and preferably up to 10% greater. The thickness of the barrier should be less, preferably significantly less, than the axial dimension of the barrier connector, to allow for potting material, and may for example be in the range 5-10 mm. The thickness of the barrier in the axial dimension may be less than 10% of the axial dimension of the barrier connector component in which or against which the barrier is located in use.

The barrier is used in conjunction with a barrier connector. The barrier connector defines a passageway, typically a bore narrowing from the mouth of the barrier connector. The barrier connector preferably comprises an internal projection positioned towards the narrower end of the bore and configured to prevent the barrier moving past the projection through the barrier connector. Preferably, the internal projection takes the form of a circumferential shoulder around the passageway of the barrier connector. The internal bore is preferably defined by a metal component.

In use the barrier is generally placed at or close to the end of an annular component which in use confines the potting material in a radial direction, and through which the cables pass.

There are a number of advantages to the foamed phenolic resin barrier. Cables can be easily pushed through it. The barrier naturally fits closely around a cable as it is pushed through, the cross-sectional area removed from the barrier being substantially the same as that of the inserted cable. When sealant is put into the barrier connector, not only are the cables held in the desired position within the barrier connector, but leakage of liquid or semi-liquid sealant is prevented by the close fitting of the barrier. The barrier holds the cables and sealant in place long enough for the sealant to harden, thus forming a permanent seal and holding the cables in place.

In this specification the terms "liquid" or "semi-liquid" refer to a consistency of sealant which would in use run or slump unacceptably prior to hardening/curing.

There is also provided a method of sealing cables within a barrier connector comprising the steps of:
  a) providing a barrier connector;
  b) providing a barrier of unapertured foamed phenolic resin of a size and shape at least as big as the transverse dimension of the internal passageway of the barrier connector;
  c) inserting the barrier into the internal passageway of the barrier connector such that it closes the internal passageway;
  d) inserting a cable through the barrier, and in consequence pushing a piece of foamed phenolic resin of substantially the same cross-section as the cable out of the barrier;
  e) repeating step d) until all required cables are held within the barrier;
  f) positioning the barrier connector upright with the barrier at the lower end of the barrier connector;
  g) pouring liquid potting material such as a two-part epoxy sealant into the barrier connector; and
  h) keeping the barrier connector upright until the potting material has set.

Preferably there is provided a further method, comprising the steps of:
  a) providing a barrier connector;
  b) forming a barrier for a barrier connector by pressing the end of a barrier connector into foamed phenolic resin such that a piece of foamed phenolic resin substantially the same size as the mouth of the passageway of the barrier connector is cut out;
  c) inserting the barrier into the internal passageway of the barrier connector such that it entirely fills the internal passageway;

d) inserting a cable through the barrier, and in consequence pushing a piece of foamed phenolic resin of substantially the same cross-section as the cable out of the barrier;

e) repeating step d) until all required cables are held within the barrier;

f) positioning the barrier connector upright with the barrier at the lower end of the barrier connector;

g) pouring liquid potting material such as a two-part epoxy sealant into the barrier connector; and h) keeping the barrier connector upright until the potting material has set.

A significant advantage of the method outlined above is the potential for producing a barrier of the correct size by using the barrier connector to cut it out. Foamed phenolic resin is easily cut through—the blunt edge of a barrier connector is more than adequate as a cutting device. A single piece of foamed phenolic resin can thus be supplied for two or more barrier connectors. All of the pieces of foamed phenolic resin provided could be of the same size, or a few discrete sizes can be produced. A thicker barrier may be constituted by several cut-outs stacked one upon another. Foamed phenolic resin material is inexpensive and thus can provide a barrier at minimal cost.

Should the barrier be used with a barrier connector having a tapered internal passageway, the compressible nature of the foamed phenolic resin will allow a barrier formed by the mouth of the internal passageway to be pushed down from the mouth to the narrowest part of the passageway.

BRIEF DESCRIPTION OF DRAWINGS

Other features of the invention will be apparent from the following description of a preferred embodiment of the invention, shown by way of example in the accompanying drawings in which:—

FIG. 1 is an exploded view of the main component of a barrier connector; and

FIG. 2 illustrates the connector of FIG. 1 in assembled form with cores and conduit.

With reference to the drawings, an annular body 10 defines at one end a reduced diameter stub 11 having an external threaded portion 12 for insertion through an aperture in a barrier 100. An abutment 13 of the body is clamped by a lock nut 101 and washer 102 in use to retain the body in the barrier. The body may alternatively be directly screwed into the barrier.

Internally the body defines a stepped bore 14 having a larger diameter portion 15 adjacent the mouth 17 thereof. The single step comprises a circular shoulder 16 having an angled planar surface facing towards the through axis 103.

The body 10 also has an external thread 18 at the mouth end to receive a nut 50, as will be described below.

The internal diameter of the stub 11 is reduced so as to define a circular radial abutment 19 facing towards the mouth, and a seal groove 20 is provided immediately adjacent this abutment on the mouth side. As illustrated, the mouth 17 has an internal circular chamfer 21 at the lip thereof.

A stepped circular cup has a small diameter outer portion 26 and a large diameter outer portion 27 separated by an angled circular step 28. These outer diameter portions 26, 27 are dimensioned to fit closely within the stepped base of the body 10 so as to define a small radial gap which in use constitutes a flame path. The flame path is not an important feature of the present invention, and if provided has a maximum radial dimension of around 0.15 mm. The angle of the step 28 matches the angle of the shoulder 16, so as to give a close fit, and is at 45° to the axis 103.

The small diameter outer portion 26 terminates at an inturned lip 29, which thus defines a maximum diameter for the passage of core(s) through the cup 25; the lip 29 also ensures that an annulus of potting material can be formed around such cores. The outer surface of the lip presents a smooth surface for compression of an "O" ring seal 30 which is housed in the seal groove 20 (FIG. 2) to prevent ingress of matter, such as moisture and/or gas.

The large diameter outer portion 27 terminates at a mouth 31 which in use lies under the transverse plane of the mouth 17 of the body 10, thus ensuring that clamp forces are directed onto the cup 25. On the inside the cup has a step 32 between portions 26 and 27, which step comprises an angled planar surface facing the mouth 31 but at an angle of 60° with respect to the axis 103.

The mouth 31 of the cup has an internal chamfer 32 to engage a seal, as will be further described.

An annular insert 35 has a plain bore and an outer surface defining at one end a scroll 36 to receive a conventional outer conduit 37 of a core. A radially outward end stop 38 defines a pocket 39 to receive and protect the end of the conduit 37. At the other end the insert has a circular boss 40 having an outer diameter selected as a sliding fit within the mouth 31 of the cup 25. This boss defines in the radial end face a circular groove 42. The internal diameter of the insert is about the same as the internal diameter of the circular lip 29 and stub 11.

A seal groove 43 is provided on the outer diameter of the insert between the boss 39 and end stop 38, and receives an "O" ring 41 (FIG. 2) which engages the chamfer 32 of the cup. A radial face 44 of the end stop 38 constitutes an abutment for engagement with the mouth 31 of the cup under certain conditions of use, to be described.

A conventional olive 48 is provided around the conduit 37, and is clamped by a conventional gland nut 50 engageable with the head 18 of the body 10 (FIG. 2).

FIG. 2 shows a complete barrier connector incorporating the invention, and installed in an operative of a barrier 100. Assembly of the connector is as follows:

Components having an internal diameter suitable for the number of core(s) 103 are selected. It is assumed that the core(s) are sheathed, and protrude from the sheath by the required amount.

Upon assembly, a disc 60 of phenol-formaldehyde foam, typically having a density of around 0.025 g/cc, is inserted into the mouth of the insert 35. In this embodiment, the disc 60 has a thickness of at least 5 mm. The foam disc closes the through bore. Such a foam is rigid, but readily pierced to permit the passage of one or more cables. One or more cables are passed loosely through the nut 50, olive 48, insert 35 and cup 25. The cup 25 and insert 35 preferably push together as a tight fit, and are somewhat loose on the cables, or at least define interstices therebetween in the absence of the foam disc 60. Such interstices must be closed in order to seal one side of the barrier from the other. In use each cable tends to push out a cylinder of foam of the same diameter as the cable, so that the remaining foam is close-fitting around that cable. The cylinder which is pushed out is waste, and may be discarded. The phenolic foam insert may be used to space the cables in a desired manner so as to ensure that adjacent cables do not touch. Ideally, the cables are sufficiently spaced to allow the cable surfaces to be wetted by sealant all of the way around.

A potting agent 104, typically a two-part epoxy sealant, is poured into the sleeve from the larger diameter end, and is of a viscosity to ensure that all spaces are filled, as illustrated in FIG. 2. The axis of the assembly is vertical during this operation. After a period of up to 4 hours such a two-part filler will typically harden, as is well-known.

With reference to FIG. 2, the tightening step compresses the olive 48 and the conduit 37 to tightly secure the sheath to the insert 35. At the same time, the insert is urged towards the body 10 so that the "O" ring 41 is compressed together with the annulus of cured sealant which lies between the step 32 and the groove 42. The groove 42 has the effect of locking the sealant radially so as to resist expansion or contraction in use.

The sealant cures to an incompressible state; however it will be appreciated that tightening of the nut 50 will tend to pre-load the annulus of cured sealant so as to deal with any slight shrinkage or movement of the joint in service, due to expansion and contraction under extremes of temperature. The "O" ring seal 41 permits such tightening, but it is not envisaged that the face 44 will come into contact with the rim of the mouth of the cup in normal conditions.

The body 10 is secured through the barrier by conventional lock nut 101 and washer 102, through other means are possible. If necessary it will be appreciated that disassembly is possible by unscrewing the nut 50, whereupon the sheath, olive, insert, cup and core(s) can be withdrawn as a unit.

For a conventional flame and pressure proof barrier connector, the components illustrated in FIG. 1 will be of metal. Typically the body, cup, insert olive and nut will be of brass. The body and nut could be of stainless steel.

Although described with a scroll 36, the insert could be truncated at the right side (as viewed) of the abutment face 44 so as to accommodate alternative kinds of cable sheath which do not require an olive, such as a tube terminating in a threaded nut (which may be straight or an elbow). Alternatively no sheath may be necessary in which case the gland nut 50 bears directly upon the insert 35.

The invention has been described in relation to electrical cores, but is clearly applicable to other kinds of linear component which may have to pass into a sealed enclosure. Such components could be for example be Bowden cables, or hydraulic conduits or pneumatic conduits.

Thus the barrier 100 is sealed. Fluid or explosive forces passing through the housing will tend to further compress the potting agent 104, tending to close and/or better seal the space between the cables and the insert 35/cup 25.

The foam disc acts as a means for retaining liquid potting material, so that in use the volume of the bore to one side of the barrier 60 can be filled whilst the fitting is held in the upright condition. Typically a runny epoxy solution may be squeezed from a suitable container into the cup 25.

Once cured, the potting material retains and seals the cables 103, as described above. After curing of the sealant, the foam disc is redundant.

The nature of phenol-formaldehyde foam is that it can be compressed and cut with ease. The compression ratio may exceed 10:1 so that the mouth of the insert 35 may be used as a cutter to form a sealing disc from a flat strip or sheet of foam material. A disc can be pressed out and broken from the base material. By using the sleeve as a cutter, the disc is also accurately sized to the bore of the sleeve, and is protected from damage which might occur if the disc were loose. Several discs may be pressed out from thin material, and arranged in contact to increase the thickness of the foam barrier.

The invention is suitable for non-circular passageways, in particular where the part defining the passageway is itself used as the cutter. Such an arrangement ensures a precise and accurate fit.

The insert 35 may include a radially inwardly projecting internal abutment to retain the foam barrier at a preferred axial location. The bore of the barrier may narrow from the insertion end of the cores 103.

The invention claimed is:

1. A barrier for use in a barrier connector, the barrier comprising:
   foamed phenolic resin having a transverse size and shape to close a passageway through the barrier connector.

2. A barrier according to claim 1, wherein the barrier has a cross sectional area of up to 10% more than that of the passageway through the barrier connector.

3. A barrier according to claim 1, wherein the thickness of the barrier ranges from 5 mm to 10 mm.

4. A barrier according to claim 1 and a barrier connector.

5. A barrier and barrier connector according to claim 4, wherein the barrier connector defines a bore narrowing from the mouth of the barrier connector, and
   wherein the barrier is configured to be pushed from the mouth of the barrier connector to a narrowest part of the bore, wherein the foamed phenolic resin is compressed and fills the narrowest part of the bore.

6. A barrier and barrier connector according to claim 4, wherein the barrier connector comprises an internal projection of the bore configured to prevent the barrier from moving past the projection through the barrier connector.

7. A barrier according to claim 6 wherein the internal projection comprises a circumferential shoulder.

8. A barrier according to claim 5 wherein the bore is defined by a metal sleeve.

9. The barrier of claim 1, wherein the barrier has a cross-sectional size greater than a cross-sectional size of the passageway through the barrier connector.

10. A method of sealing cables within a barrier connector comprising the steps of:
   a) providing a barrier connector;
   b) providing a barrier of unapertured foamed phenolic resin of a size and shape at least as big as an internal passageway of the barrier connector;
   c) inserting the barrier into the internal passageway of the barrier connector such that it entirely fills the internal passageway;
   d) inserting a cable through the barrier, and in consequence pushing a piece of foamed phenolic resin of substantially the same cross-sectional size as the cable out of the barrier;
   e) repeating step d) until all required cables are held within the barrier;
   f) positioning the barrier connector upright with the barrier at the lower end of the barrier connector;
   g) pouring liquid potting material into the barrier connector; and
   h) keeping the barrier connector upright until the potting material has set.

11. The method of claim 10, wherein the potting material comprises a two-part epoxy sealant.

12. The method of claim 10, wherein the internal passageway is tapered and the inserting the barrier into the internal passageway comprises:
   pushing the barrier into the internal passageway, wherein the foamed phenolic resin is compressed and fills a narrowest part of the internal passageway.

13. A method of sealing a plurality of cables within a barrier connector comprising the steps of:
   a) providing a barrier connector;
   b) forming a barrier for the barrier connector by pressing the end of the barrier connector into foamed phenolic resin such that a piece of foamed phenolic resin substantially the same size as the mouth of an internal passageway of the barrier connector is cut out;
c) inserting the barrier into the internal passageway of the barrier connector such that it fills the internal passageway;
d) inserting a cable through the barrier, and in consequence pushing a piece of foamed phenolic resin of substantially the same cross-sectional size as the cable out of the barrier;
e) repeating step d) until the plurality of cables are held within the barrier;
f) positioning the barrier connector upright with the barrier at the lower end of the barrier connector;
g) pouring liquid potting material into the barrier connector; and
h) keeping the barrier connector upright until the potting material has set.

14. The method of claim 13, wherein the liquid potting material comprises a two-part epoxy sealant.

15. The method of claim 13, wherein the internal passageway is tapered and the inserting the barrier into the internal passageway comprises:
pushing the barrier into the internal passageway, wherein the foamed phenolic resin is compressed and fills a narrowest part of the internal passageway.

* * * * *